United States Patent [19]

Davis

[11] Patent Number: 4,612,897

[45] Date of Patent: Sep. 23, 1986

[54] HEATED FUEL DELIVERY SYSTEM FITTING AND METHOD

[75] Inventor: Leland L. Davis, Saline, Mich.

[73] Assignee: Davco Manufacturing Corporation, Ann Arbor, Mich.

[21] Appl. No.: 653,854

[22] Filed: Sep. 24, 1984

[51] Int. Cl.[4] ............................................. F02M 31/00
[52] U.S. Cl. .................................... 123/557; 123/514; 123/516
[58] Field of Search ................ 123/557, 514, 516, 552

[56] References Cited

U.S. PATENT DOCUMENTS

| | | | |
|---|---|---|---|
| 2,599,699 | 6/1952 | Dilworth | 123/514 |
| 3,913,543 | 10/1975 | Richard . | |
| 3,951,124 | 4/1976 | Fairbanks | 123/557 |
| 4,015,567 | 4/1977 | Zabenskie . | |
| 4,027,639 | 6/1977 | Amano . | |
| 4,146,002 | 3/1979 | Quinn . | |
| 4,232,421 | 11/1980 | Tucker | 123/557 |
| 4,249,502 | 2/1981 | Hover | 123/557 |
| 4,323,043 | 4/1982 | Alderson . | |
| 4,323,044 | 4/1982 | Erwin | 123/557 |
| 4,326,491 | 4/1982 | Burchett . | |
| 4,368,716 | 1/1983 | Davis | 123/557 |
| 4,372,279 | 2/1983 | Parks . | |
| 4,395,997 | 8/1983 | Lee, Sr. . | |
| 4,397,288 | 8/1983 | Kelling . | |
| 4,411,240 | 10/1983 | Kravetz . | |
| 4,422,429 | 12/1983 | Reed . | |
| 4,423,716 | 1/1984 | Glass | 123/557 |
| 4,424,789 | 1/1984 | Spalding . | |
| 4,454,851 | 6/1984 | Bourbornaud | 123/516 |

Primary Examiner—Ronald H. Lazarus
Attorney, Agent, or Firm—Harness, Dickey & Pierce

[57] ABSTRACT

A heated fuel delivery system joint and method is disclosed which is most advantageously employed in connection with a fuel oil delivery system for a diesel engine powered motor vehicle. In such fuel delivery systems, fuel processor devices are often employed to prevent fuel clouding and waxing and ice accumulation from restricting fuel flow to the engine. Even when such fuel processors are used, excessively low temperatures of fuel can cause fuel supply problems in fittings and conduits which connect the fuel tank to the fuel processor. In accordance with this invention, these fittings and conduits are warmed by removing a portion of the heated fuel exiting from the fuel processor and introducing it into a fitting at the fuel tank discharge port. By mixing the warmed fuel with cold fuel withdrawn from the fuel tank, the combined temperature of the fuel is increased, thereby minimizing problems associated with excessively cold fuel. Various means are described for energizing the fuel pump such that it operates in response to sensed fuel temperature or whenever the operator of the associated motor vehicle has set the heater controls to a position to provide heat to the vehicle interior.

13 Claims, 2 Drawing Figures

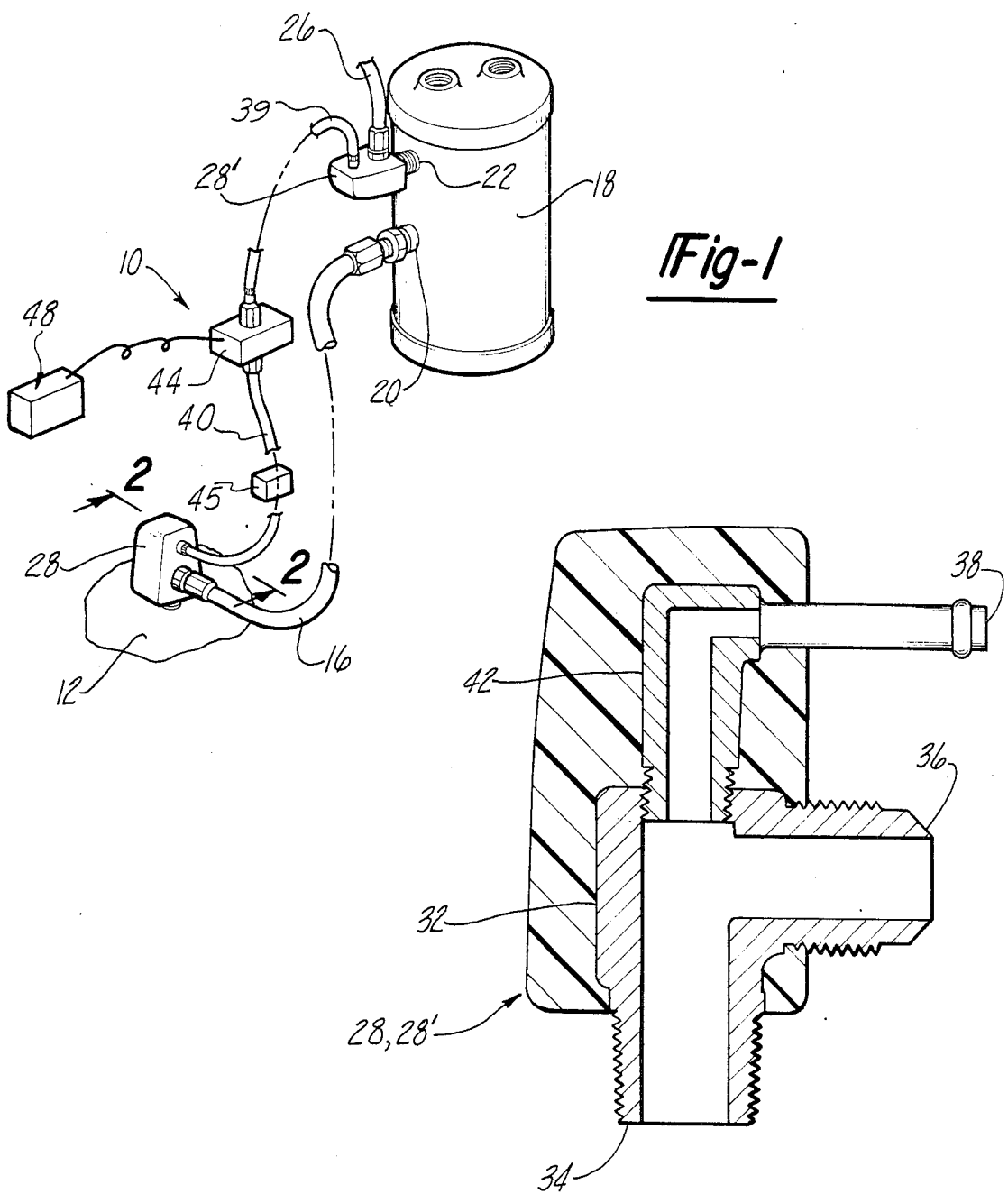

HEATED FUEL DELIVERY SYSTEM FITTING AND METHOD

BACKGROUND AND SUMMARY OF THE INVENTION

This invention relates to a fuel delivery system heater, and particularly, to an apparatus and method for warming the fittings and fuel within a fuel line of a diesel powered motor vehicle which connects the fuel tank to a fuel processor.

Diesel powered apparatus such as motor vehicles are often operated in environmental conditions wherein the fuel oil and fuel delivery circuit are subjected to cold ambient temperatures. At sufficiently low temperatures, fuel oil can cloud, becoming viscous and actually develop solid wax particles. In addition, water, a common fuel contaminate, can accumulate as solid ice deposits. These conditions severely restrict fuel flow within the fuel delivery lines. In order to address such problems, many users of diesel powered apparatus provide a fuel processor within the fuel delivery system. a number of such devices are described by my previously issued U.S. Pat. Nos. 4,368,716; 4,428,351; 4,395,996; 4,421,090 and pending patent applications, Ser. Nos.: 463,041, filed Feb. 1, 1983; and 573,292, filed Jan. 23, 1984. Many of the fuel processors described by the preceding patents and patent applications further provide a water separating and particulate filtration function. Since these fuel processors are typically mounted some distance from the fuel tank, however, fuel within the lines connecting the fuel tank and fuel processor are not subjected to the heating effect provided by the fuel processor. These lines are therefore subject to fuel line restrictions caused by cold temperatures. Particular problems have been encountered in the field with fuel flow restrictions developing at the fuel line elbow fitting connected to the fuel tank.

It is an object of this invention to provide an apparatus and method which acts to warm fuel in the fuel line connecting a fuel tank to a fuel processor device. It is a further object of this invention to enable modulation of the warming effect of the fuel in the fuel line to prevent warming in conditions where it is unnecessary.

The above principal objects of this invention are achieved by employing a pair of improved fuel connection fittings, each having three ports communicating with an interior chamber. One of such fittings is connected to the fuel tank and another to the fuel processor outlet. Two of the remaining ports of the fittings are employed to conduct fuel in the normal flow path. The third ports, however, are employed to remove a portion of the warmed fuel exiting from the fitting at the fuel processor and circulates the fuel to the fitting connected to the fuel tank. Such flow is caused by the action of an inline fuel pump, preferably of an electrically powered variety. A portion of the warmed fuel, therefore, is mixed with cold fuel being drawn from the fuel tank, thereby increasing its combined temperature. Such increased fuel temperature reduces the likelihood of restrictions within the fuel line fittings and through the fuel line itself cause by low fuel temperature.

Additional benefits and advantages of the present invention will become apparent to those skilled in the art to which this invention relates from the subsequent description of the preferred embodiments and the appended claims, taken in conjunction with the accompanying drawings.

BRIEF DESCRIPTION OF THE DRAWINGS

FIG. 1 is a schematic pictorial diagram of the heated fuel delivery system according to this invention showing a pair of backflow fittings connected via a backflow conduit with these units connected in a system including a primary flow conduit and a fuel processor device;

FIG. 2 is a cross-sectional view through a backflow fitting showing the internal components thereof.

DETAILED DESCRIPTION OF THE INVENTION

A heated fuel delivery system 10 according to this invention is generally shown in FIG. 1. A portion of FIG. 1 illustrates a typical fuel delivery system for a diesel powered motor vehicle having fuel tank 12 (shown with a portion cut away) to which conventional fitting 14 (not shown) is attached. Fuel flows from within fuel tank 12 into primary flow conduit 16 and thereafter into fuel processor 18 via inlet port 20. Any high performance fuel processor 18 may be used such as those described by the previously identified issued patents and pending patent applications. The specific fuel processor 18 shown is generally similar to a device encompassed by my U.S. Pat. No. 4,368,716 which describes the device known in the industry as the Davco "Fuel Pro" (Registered TM of Davco, Inc.) Fuel becomes warmed within fuel processor 18 and thereafter exits through fuel processor outlet port 22. Conventional fitting 14' (not shown) is connected to processor outlet port 22 and conducts fuel into conduit 26, where it is thereafter directed to the fuel consuming apparatus such as an internal combustion engine. Since fuel flows from tank 12 to fuel processor 18, it is not heated as it flows through conventional fittings 14, 14' and primary flow conduit 16. Therefore, fuel restrictions caused by low ambient temperatures can result within the fittings and conduit 16. The likelihood of such restrictions occurring is very much reduced through employing the apparatus and method according to this invention which will now be described in detail.

In accordance with this invention, a portion of the heated fuel exiting from fuel processor outlet port 22 is withdrawn and introduced into the fuel tank fitting such that warmed fuel mixes with cold fuel being pumped from the tank, thereby increasing its combined temperature. Such flow is provided by employing backflow fittings 28 and 28'. The internal construction and configuration of these fittings are best described with reference to FIG. 2. As shown therein, each of backflow fittings 28 and 28' include housing portion 32 which has a hollow interior cavity which communicates with primary flow inlet 34, primary flow outlet 36 and backflow port 38. Backflow port 38 may be provided by a separate fitting 42 shown attached to housing 32 or the housing may integrally form the port. The longitudinal axes of primary flow inlet 34 and primary flow outlet 36 are oriented 90 degrees with respect to each other. This configuration is intended to enable replacement of the conventional fittings 14 and 14' typically used in heavy duty motor vehicle applications with backflow fittings 28 and 28'. However, other orientations between the fitting inlets and outlets may be employed. Inlet 34 and outlet 36 are further shown having external threads which are adapted to receive correspondingly threaded fittings. However, other types of fittings could by employed. For instance, either of inlet 34 or outlet 36 may form internal threads or one or both may be designed to accommodate a compression type tubing coupling. As will be described subsequently, the volumetric flow rate through backflow ports 38 is less than that through primary flow inlet 34 or outlet 36 and therefore may have a reduced cross-sectional area. Backflow fittings 28 and 28' are preferably encapsulated within a material such as a polymeric plastic substance which provides a degree of thermal insulation, thereby enhancing retention of heat of the fuel as it passes through the fittings.

Now referring back to FIG. 1, backflow fitting 28 is attached to fuel tank 12 and to primary flow conduit 16 so that fuel flows into primary flow inlet 34, out of primary flow outlet 36, into primary flow conduit 16 and thereafter into fuel processor 18. Backflow fitting 28' is attached at outlet port 22 of fuel processor 18 such that fuel flows into primary flow inlet 34 and out of outlet 36. a pair of backflow conduits 39 and 40 are connected to backflow ports 38 of fittings 28 and 28' and to inline fuel pump 44. Energization of fuel pump 44 causes warmed fuel to be pumped from backflow fitting 28' into backflow fitting 28. Backflow conduits 40 and 39 may be constructed from a thermally insulated material or covered with a thermal insulator to prevent undesirable heat transfer from the fuel therein. When fuel pump 44 is actuated and heated fuel is mixed with colder fuel within backflow fitting 28, the combined fluid fuel temperature is increased over that drawn from fuel tank 12. This increas in temperature decreases the liklihood of fuel constructions from occurring due to low fuel temperature.

Since fluid flow through backflow conduits 40 and 39 represents a circular fluid circuit, it is necessary to ensure that the volumetric flow rate through backflow conduits 40 and 39, is less than that through primary flow conduit 16 (otherwise no fuel would flow into conduit 26). Such flow rate limitations are provided by properly selecting the volumetric flow rate properties of fuel pump 44 in view of the restrictions in the backflow circuit and the pressure difference being pumped against.

It is undesirable to permit fuel flow through backflow conduits 40 and 39 in a direction from backflow fitting 28 to backflow fitting 28', since this represents a "short circuiting" of fuel processor 18. Therefore, a check valve 45 should be installed within backflow conduits 40 or 39, or within fuel pump 44. alternately, a type of fuel pump 44 could be employed which inherently prevents such reverse flow from occurring.

Since it is unnecessary to operate fuel pump 44 to cause backflow of fuel through conduits 40 and 39 during operation where ambient conditions do not require fuel heating, a scheme for modulating fuel pump 44 is desired. By employing a thermally responsive element 48 that senses the temperature of fuel within fuel tank 12 or backflow fitting 28, fuel pump 44 could be controlled to operate only when the sensed fuel temperature is below a predetermined level. In a preferred form of this invention, however, fuel pump 44 would be energized when the operator of a motor vehicle has set the cabin heater controls to a position to provide heat for the interior. Such heater control settings would only occur in conditions where the ambient temperatures are low. In this preferred embodiment, therefore, the motor vehicle operator acts as a thermostatic element in the system for sensing the ambient temperatures and controlling operation of fuel pump 44.

While the above description constitutes the preferred embodiments of the present invention, it will be appreciated that the invention is susceptible to modification, variation and change without departing from the proper scope and fair meaning of the accompanying claims.

What is claimed is:

1. In a fuel supply system for a combustion apparatus including a fuel tank, a fuel heater, a primary flow conduit connected to said fuel tank and said fuel heater, and a supply conduit connected to said fuel heater for supplying fuel to said combustion apparatus, the improvement comprising:
   a first fitting means having a primary flow inlet in fluid communication with an outlet port of said fluid heating apparatus, said first fitting means further having a primary flow outlet connected to said supply conduit and a backflow port,
   a second fitting means having a primary flow inlet in fluid communication with said fuel tank, a primary flow outlet connected to said primary flow conduit, and a backflow port,
   backflow conduit means communicating with said first fitting means backflow port with said second fitting means backflow port, and
   pump means causing warmed fuel from said first fitting means backflow port to flow to said second fitting means backflow port wherein warmed fuel from said first fitting means mixes with fuel in said second fitting means thereby warming said second fitting means and fuel therein.

2. An improved fuel supply system according to claim 1 wherein said fuel is fuel oil used for a diesel powered motor vehicle.

3. An improved fuel supply system according to claim 1 wherein at least one of said first and second fitting means has a housing which is encapsulated within a thermally insulating material.

4. An improved fuel supply system according to claim 1 wherein said backflow conduit means is a thermally insulated type.

5. An improved fuel supply system according to claim 1 wherein said first fitting means primary flow inlet and outlet are adapted to be connected to fluid flow paths oriented 90 degrees with respect to each other.

6. An improved fuel supply system according to claim 1 wherein said second fitting means primary flow inlet and outlet are adapted to be connected to fluid flow paths oriented 90 degrees with respect to each other.

7. An improved fuel supply system according to claim 1 wherein said pump means is electrically powered.

8. An improved fuel supply system according to claim 1 further comprising check valve means within said conduit means preventing fluid flow in a direction from said second fitting means backflow port to said first fitting means backflow port.

9. An improved fuel supply system according to claim 1 further comprising means for controllably energizing said pump means in response to ambient temperatures.

10. A backflow fitting for connection to a fuel tank or to a fuel heater for use in a fuel delivery circuit wherein fuel flows from said fuel tank through a primary flow conduit to an inlet of said fuel heater, said backflow fitting further adapted to provide a backflow fluid circuit which conducts a portion of the warmed fuel from a first backflow fitting connected to said fuel heater outlet to a second backflow fitting connected to said fuel tank, pump means provided in said backflow fluid circuit causing the warmed fluid to flow, said backflow fittings comprising:

a housing having a primary flow inlet, a primary flow outlet, and a backflow port communicating with an internal chamber of said housing, said backflow port acting as a backflow outlet when said fitting is connected to said fuel heater or as a backflow inlet when said backflow fitting is connected to said fuel tank.

11. A fitting according to claim 10 wherein said fuel is fuel oil used for a diesel powered motor vehicle.

12. A fitting according to claim 10 wherein said housing is encapsulated within a thermally insulating material.

13. A fitting according to claim 10 wherein said primary flow inlet and outlet have longitudinal bore axes oriented 90 degrees with respect to each other.

* * * * *